United States Patent [19]
Payne, Jr. et al.

[11] Patent Number: 5,357,377
[45] Date of Patent: Oct. 18, 1994

[54] TRUE IMAGE MIRROR

[75] Inventors: C. Lee Payne, Jr.; Lisa G. Barde; Frans M. Weterring, all of Atlanta, Ga.

[73] Assignee: Lawrence C. Zaglin, Atlanta, Ga.

[21] Appl. No.: 949,162

[22] Filed: Sep. 23, 1992

[51] Int. Cl.5 .......................... G02B 5/08; G02B 7/18; E05D 1/00
[52] U.S. Cl. .................... 359/855; 359/865; 16/225; 16/334
[58] Field of Search .......... 16/223, 225, 334; 359/850, 855, 871, 872, 857, 865

[56] References Cited

U.S. PATENT DOCUMENTS

| 881,947 | 3/1908 | Petersen . | |
|---|---|---|---|
| 1,512,005 | 10/1924 | Wright . | |
| 1,815,966 | 7/1931 | Campbell . | |
| 3,186,574 | 6/1965 | Davidson | 16/225 |
| 3,210,808 | 10/1965 | Creager | 16/225 |
| 3,527,527 | 9/1970 | Manowitz | 350/295 |
| 3,592,354 | 7/1971 | Nielsen | 16/225 |
| 3,981,470 | 9/1976 | Rutili et al. | 16/225 |
| 4,144,924 | 3/1979 | Vanden Hoek | 16/225 |
| 4,639,102 | 1/1987 | Fetko et al. | 350/626 |
| 4,673,087 | 6/1987 | Webb | 16/225 |
| 4,852,213 | 8/1989 | Shewchuk | 16/225 |

FOREIGN PATENT DOCUMENTS

| 1068869 | 11/1959 | Fed. Rep. of Germany . | |
|---|---|---|---|
| 0002017 | 1/1987 | Japan | 16/225 |
| 0267025 | 8/1964 | Netherlands | 16/225 |
| 9000662 | 1/1990 | PCT Int'l Appl. | 16/225 |
| 1252809 | 8/1971 | United Kingdom | 16/225 |

Primary Examiner—Ricky D. Shafer
Attorney, Agent, or Firm—Jacobson, Price, Holman & Stern

[57] ABSTRACT

A basic known mirror assembly incorporating a pair of side-by-side plane mirror members (right and left) is provided with the mirror members pivotally supported from each other along adjacent margins and relatively positionable to define an included, angle therebetween of substantially 75 degrees so as to provide to a person viewing himself or herself with side-by-side registered one-half image views together forming a single image of the person which is a true image and not an image which is reversed in front-two-rear relation. The mirror members are pivotally supported from each other through the use of hinge constructions each including a pair of hinge leaves interconnected by a living hinge zone and wherein each hinge leaf defines a hollow open ended housing. The housings are of large and small dimensions such that the small dimension housing may be received substantially entirely within large dimension housing when the mirror members are relatively angulated to define an included angle of substantially 75 degrees.

9 Claims, 2 Drawing Sheets

TRUE IMAGE MIRROR

BACKGROUND OF THE INVENTION

1. Field of the Invention

This invention relates to a mirror construction such is that disclosed in U.S. Pat. No. 4,639,102 for producing side-by-side registered ½ image views of a person viewing himself or herself in the mirror construction with the ½ image views together forming a single image of the person which is a true image and not an image which is reversed in front-to rear relation.

2. Description of Related Art

U.S. Pat. No. 4,639,102 discloses the basic construction of the instant invention and U.S. Pat. Nos. 881,947, 1,512,005, 1,815,966 and 3,527,527 as well as German Patent No. 1,068,869 disclose generally similar folding mirror constructions. However, these previous patents do not disclose the novel hinge construction incorporated in the instant invention.

SUMMARY OF THE INVENTION

The mirror device of the instant invention includes a pair of mirror members pivotally joined together along adjacent marginal edge portions for relative swinging of the mirror members between closed and opened positions. The mirror members include reflective surfaces disposed in closely juxtaposed position when the mirror members are in the closed positions and the mirror assembly includes hinge structure whereby the mirror members may be swung to and releasably retained in positions with the reflective surfaces thereof defining and included angle of substantially 75 degrees.

The hinge structures also may be used to releasably retain the mirror members in relative positions defining an included angle of substantially 90 degrees.

The main object of this invention is to provide a hinge construction for use in pivotally joining a pair of mirror members and wherein the hinge construction includes features whereby the associated mirror members may be releasably retained in relatively angulated positions defining either an included angle of substantially 75 degrees or an include angle of substantially 90 degrees.

Another object of this invention is to provide a hinge construction which is of one piece design and which may be readily manufactured of a suitable plastic through the utilization of conventional plastic molding apparatus.

A further object of this invention is to provide a hinge construction for use between frames extending about plane mirror members and with the hinge construction being adapted for mounting from substantially any planar surface.

Yet another object of this invention is to provide a hinge construction incorporating a pair of hinge leaves joined together through the utilization of a living hinge portion and wherein the hinge leaves coact with each other to define a substantially closed housing for concealing the relatively angularly displaceable hinge portions of the hinge from the view of a person viewing his or himself in the mirror construction.

A final object of this invention to be specifically enumerated herein is to provide a mirror assembly in accordance with the preceding objects and which will conform to conventional forms of manufacture be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
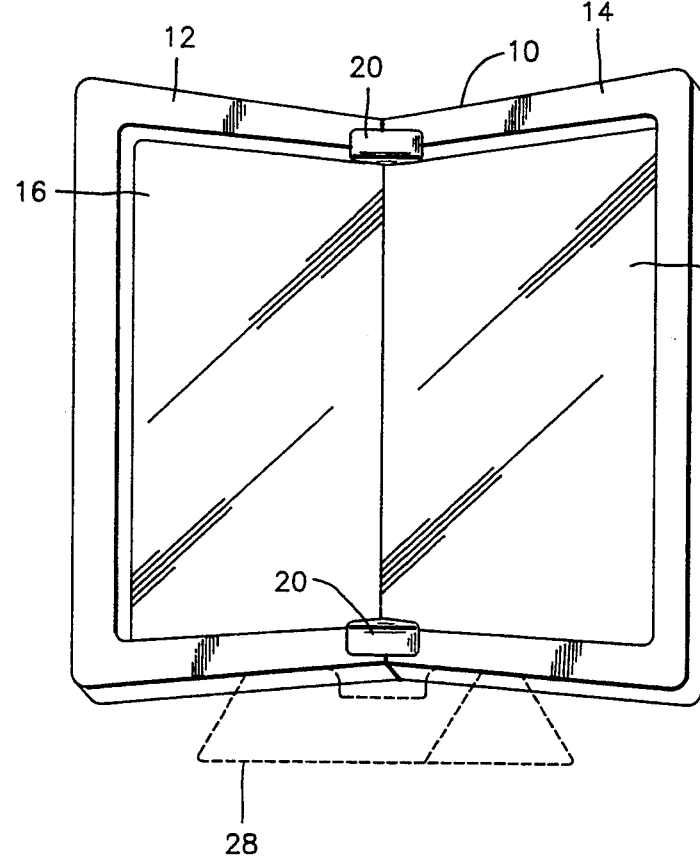
FIG. 1 is a front perspective view of the true image mirror of the instant invention as viewed from the forward side thereof when the mirror is in an open position and with a supportive base construction therefore illustrated in phantom lines.

Referring now more specifically to the drawings the numeral 10 generally designates the mirror assembly of the instant invention. The assembly 10 includes a pair of mirror frames 12 and 14 each supporting a plane mirror element or member 16 therefrom. A pair of hinge assemblies 20 pivotally interconnect the members 16 for relative swinging between the closed positions thereof illustrated in FIG. 2 and open positions such as those illustrated in FIGS. 3 and 4 wherein the mirror elements or members 16 are angulated relative to each other defining included angles of substantially 90 and substantially 75 degrees, respectively.

The frames 12 and 14 are notched beneath the hinge assemblies 20 and the latter each incorporate a pair of first and second hinge leaves 22 and 24 which are secured in any convenient manner to the mirror elements or members 16. Furthermore, formed integrally with the frames 12 and 14 is a flexible boot or web portion 26 which spans between the adjacent marginal edges of the frames 12 and 14.

Figure 2:
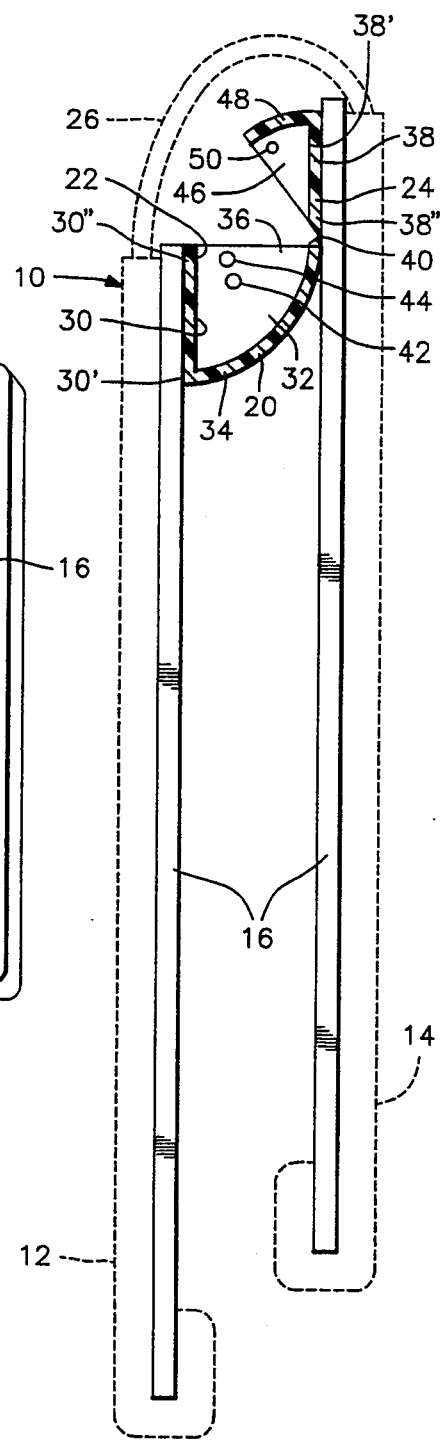
FIG. 2 is a top plan view of the mirror construction with the mirror members thereof in closed position and with the uppermost hinge illustrated in horizontal section and the frames from which the mirror members are supported illustrated in phantom lines as well as the flexible boot portion extending between the frames.

When the frames 12 and 14 are in the closed positions thereof illustrated in FIG. 2, the spacing therebetween may be filled with a compartment defining structure (not shown) in which various individual compartments may be defined for receiving a plurality of makeup materials such as power, rouge, lip gloss, eyeliner and eyebrow pencil, etc. Furthermore, a supportive base 28 such as that illustrated in phantom lines in FIG. 1 may be provided for removably supporting the mirror assembly in an operative upstanding position from a suitable support surface, if desired.

Each of the hinge assemblies 20 includes a pair of the aforementioned hinge leaves 22 and 24. The hinge leaf 22 includes a plane base panel 30 having first and second ends 30' and 30" and which is bonded or otherwise secured to the corresponding mirror element 16 and a pair of sector shaped opposite side walls 32 projecting outwardly from opposite side margins of the plane base panel 30. An arcuate outer end wall 34 extends between the arcuate edges of the sector shaped sidewalls 32 and extends from one marginal edge of the plane base panel 30 extending between the sidewalls 32 and the remote arc ends of the sidewalls 32. The hinge leaf 22 defines a wide quarter circular box shaped housing including a open side as at 36. Also, it may be noted from FIG. 2 of the drawings that the arcuate outer end wall 32 extends slightly beyond the open end of the quarter cylindrical housing defined by the hinge leaf 22 and is joined to the plane base panel 38 (having first and second end 38' and 38") of the hinge leaf 24 corresponding to the plane base panel 30 through the utilization of a living hinge zone 40 formed integrally with the plane base panels 30 and 38. Also, it may be seen from FIG. 2 that the sidewalls 32 each include a pair of small diameter openings or detent recesses 42 and 44 formed therethrough and that the openings 42 and 44 are spaced along an arcuate path having the living hinge zone 40 as its center of curvature.

The hinge leaf 24 defines a narrow housing including a pair of sector shaped opposite sidewalls 46 corresponding to the sidewalls 32 and a partial cylindrical end wall 48 corresponding to the outer end wall 34, the sidewalls 46 each including an outwardly directed detent projection 50 spaced from the living hinge zone 40 the same distance the openings 42 and 44 are spaced from the zone 40. Therefore, the detent projections 50 may register with and be seated in either the openings 44 or the openings 42, the sidewalls 46 being spaced apart a lesser distance than the spacing between the sidewalls 32 and snugly receivable between the sidewalls 32. The radial distance of the partial cylindrical end wall 48 from the living hinge zone 40 is slightly less than the spacing of the plane base panel 30 from the living hinge zone 40, whereby the partial cylindrical end wall 48 may be received inwardly of the base panel 30 when the mirror elements or members 16 are relatively angulated to the position thereof illustrated in FIGS. 3 and 4.

Figure 3:
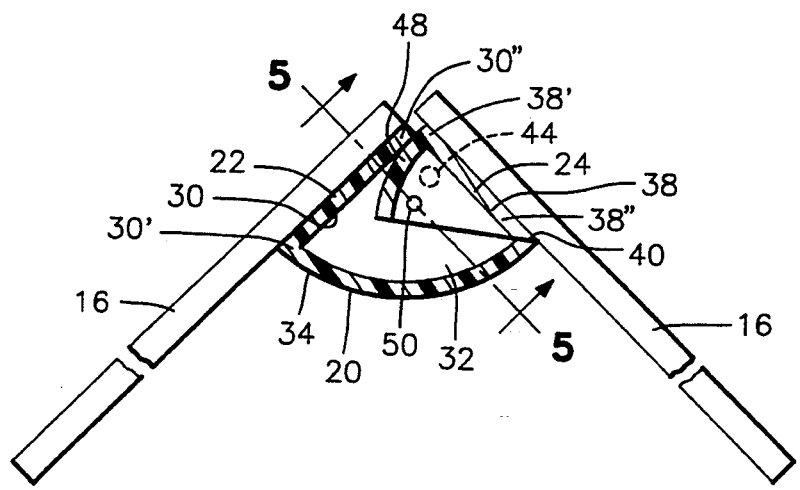
FIG. 3 is a top plan view similar to FIG. 2 but with the mirror members illustrated schematically and relatively pivoted to an open position defining an included angle of substantially 90 degrees.
Figure 4:
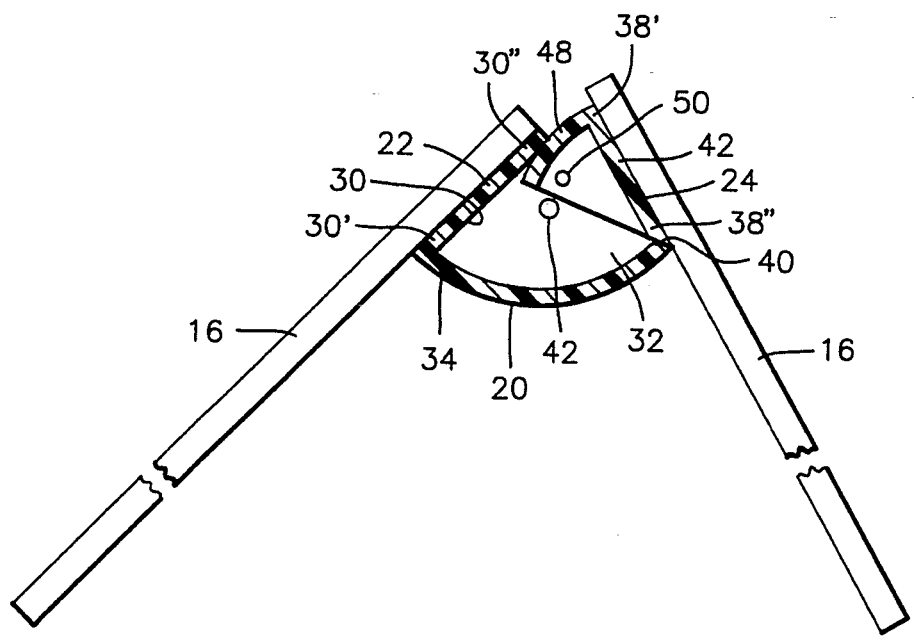
FIG. 4 is top plan view similar to FIG. 3 illustrating the mirror members defining an included angle of substantially 75 degrees.
Figure 5:
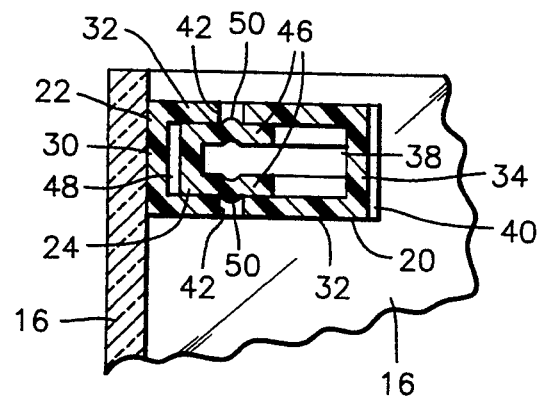
FIG. 5 is an enlarged fragmentary vertical sectional view taken substantially upon the plane indicated by the section line 5—5 of FIG. 3.

In FIG. 3, the mirror elements or members 16 are disposed substantially 90 degrees relative to each other and the detent projections 50 are seated in the openings 42. However, in FIG. 4, the detent projections 50 are seated in the openings 44 and the mirror elements or members 16 are relatively angulated substantially 75 degrees.

If it is desire, only one of the sidewalls 46 of the hinge leaf 24 may be provide with the corresponding detent projection 50 and only the corresponding sidewall 32 of the hinge leaf 22 may be provide with the openings 42 and 44. With attention now invited more specifically to FIGS. 2, 3 and 4 of the drawings, it may be seen that the hinge assemblies 20, when the mirror elements or members 16 are relatively swung to the position thereof illustrated in FIGS. 1 and 3, define completely closed hinged assemblies insofar as outward appearance is concerned. In this manner, a vary pleasing appearance is afforded by the hinge assemblies 20. Still further, when the mirror elements or members 16 are relatively swung to the position thereof illustrated in FIG. 4, the hinge assemblies 20 appear as substantially fully closed constructions and therefore still afford a pleasing appearance.

The foregoing is considered as illustrative only of the principles of the invention. Further, since numerous modifications and changes will readily occur to those skilled in the art, it is not desired to limit to the invention to the exact construction and operation shown and described, and accordingly, all suitable modifications and equivalents may be resorted to falling within the scope of the invention.

What is claimed as new is as follows:

1. A hinge assembly including first and second hinge leaves each incorporating a base panel having corresponding first and second ends, said hinge leaves each being adapted to be mounted from a corresponding element of a pair of elements to be relatively hingedly supported for swinging between a closed closely juxtaposed position and at least one open position, each of said base panels including a pair of elongated, generally parallel sidewalls extending along and projecting outwardly from opposite longitudinal margins thereof and an arcuate end wall extending between said sidewalls at said first end thereof and curving toward said second end thereof to define an open ended housing, said housing including wide and narrow housings, the spacing between said sidewalls of said wide housing being greater than the spacing between the outer sides of the sidewalls of said narrow housing, said second end of said base panel of said narrow housing and the end of the arcuate end wall of said wide housing remote from said first end of said base panel of said wide housing being joined by an integral living hinge, the spacing between said second end of the base panel of said wide housing and the end of the corresponding end wall adjacent the open end of the wide housing being sufficiently greater than the distance between said living hinge and the arcuate end wall of said narrow housing to enable said narrow housing be swung laterally into the open end of said wide housing.

2. The hinge assembly of claim 1 wherein at least one of said sidewalls of one of said housings includes a detent projection projecting toward the corresponding sidewall of the other of said housings and said corresponding sidewall of said other housing includes at least one detent recess into an out of seated registry with which said projection is movable upon relative angular displacement of said housings.

3. The hinge assembly of claim 2 wherein said one of said housings comprises said narrow housing.

4. The hinge assembly of claim 2 wherein each of the sidewalls of said one housing includes a detent projection and each of the sidewalls of the other of said housing includes a corresponding detent recess.

5. The hinge assembly of claim 4 wherein said one of said housing comprises said narrow housing.

6. The hinge assembly of claim 2 wherein said corresponding sidewall of said other housing includes a pair of detent recesses with which said detent projection is successively seatingly registrable upon relative angular displacement of said housings.

7. The hinge assembly of claim 1 including a pair of relatively angulated plane mirror elements, said mirror elements comprises said pair of elements and having adjacent and generally parallel first margins, said base panels being mounted from said first margins.

8. The hinge assembly of claim 1 wherein at least one of said sidewalls of one of said housings include a detent projection projecting toward the corresponding sidewall of the other said housings and said corresponding sidewall of said other housing includes at least one detent recess into an out of seated registry with which said projection is movable upon relative angular displacement of said housings, said corresponding sidewall of said other housing includes a pair of detent recesses with which said detent projection is successively seatingly registrable upon relative angular displacement of said housings, a pair of relatively angulated plane mirror elements, said mirror elements comprises said pair of elements and having adjacent and generally parallel first margins, said base panels being mounted from said first margins, said relatively angulated plane mirror elements defining angles of substantially 90 degrees and substantially 75 degrees when said detent projection is seated in a first of said detent recesses and a second of said detent recesses, respectively.

9. The hinge assembly of claim 1 including a pair of relatively angulated plane mirror elements, said mirror element comprises said pair of elements and having adjacent and generally parallel first margins, said base panels being mounted from said first margins, said plane mirror elements including reflective sides and non-reflective sides, said non-reflective sides each being covered with a frame panel of flexible material, and a flexible web portion extending between and interconnecting said frame panels in a manner enclosing said first margins on the non-reflective sides of said plane mirror elements.

* * * * *